March 17, 1925.

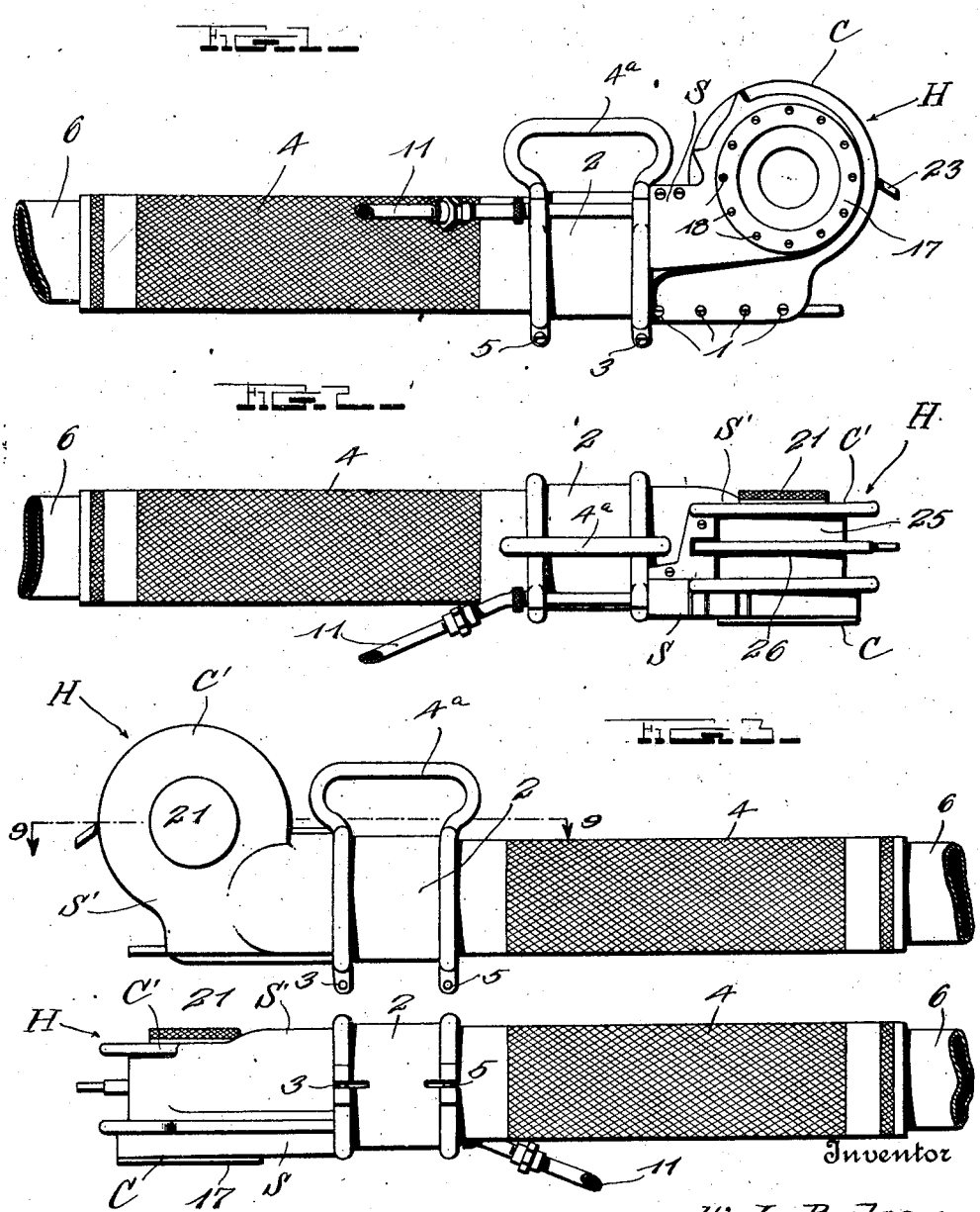

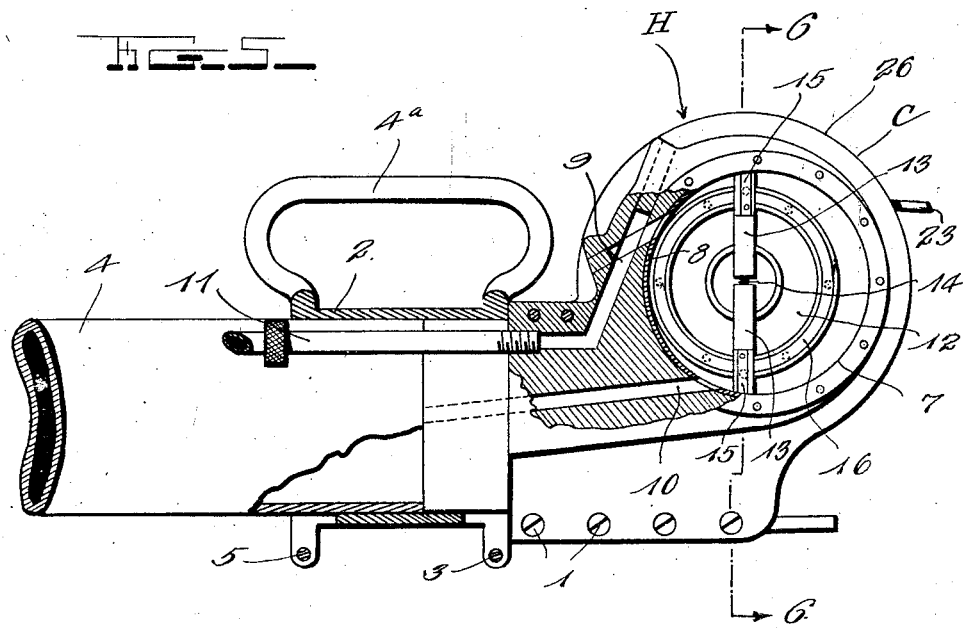
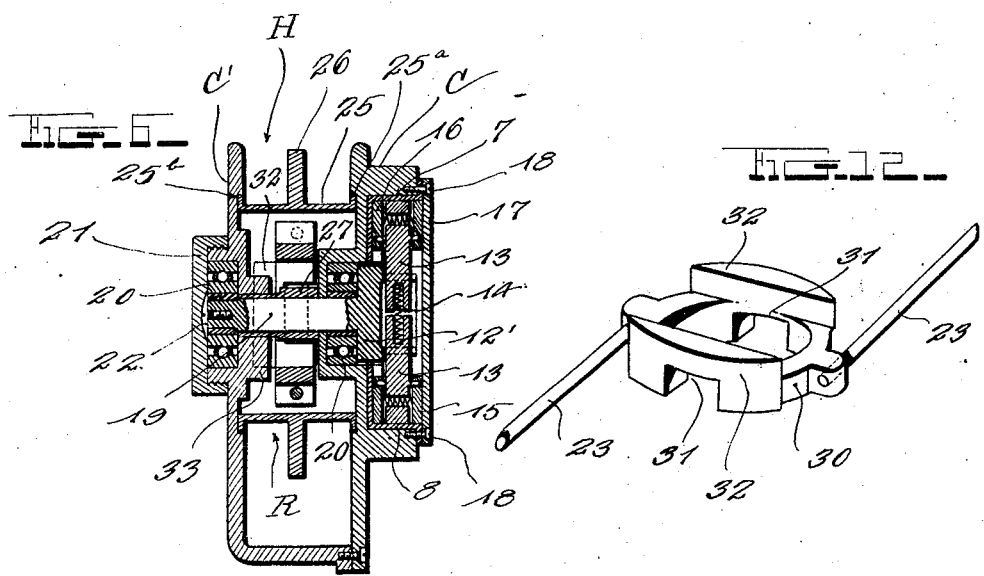

W. L. BAKER

PICKER HEAD

Filed Aug. 12, 1920

Inventor
W. L. Baker
By H. R. Wilson & Co.
Attorneys

Witness
H. Woodard

March 17, 1925.                                        1,530,458
                        W. L. BAKER
                        PICKER HEAD
                    Filed Aug. 12, 1920        4 Sheets—Sheet 4
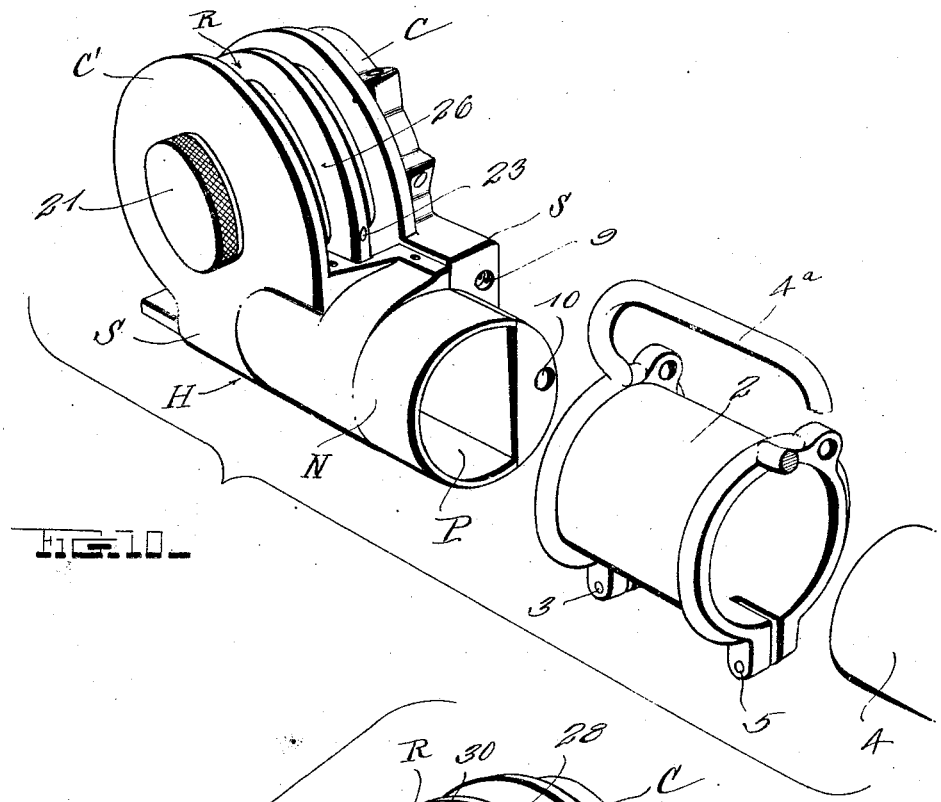
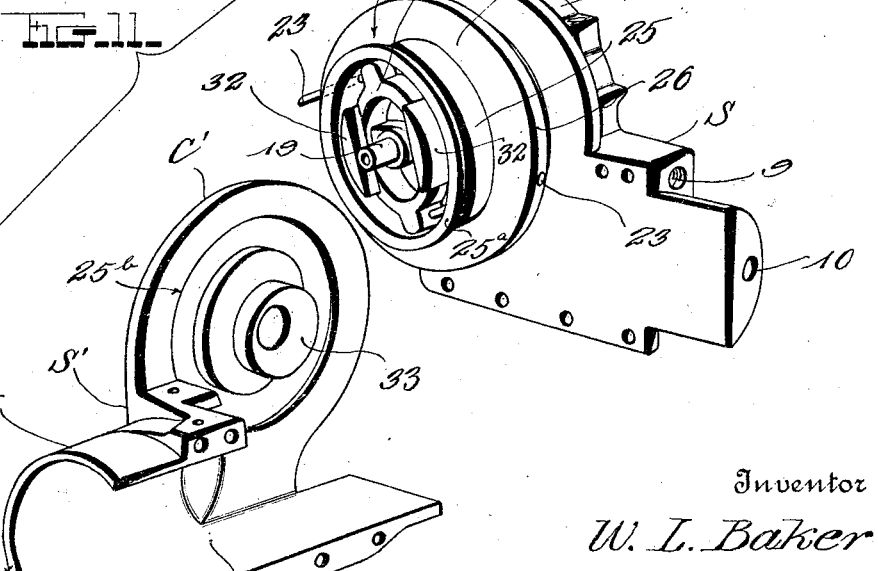
Inventor
W. L. Baker Patented Mar. 17, 1925.

1,530,458

UNITED STATES PATENT OFFICE.

WILLIAM L. BAKER, OF NEW ORLEANS, LOUISIANA.

PICKER HEAD.

Application filed August 12, 1920. Serial No. 403,021.

*To all whom it may concern:*

Be it known that I, WILLIAM L. BAKER, a citizen of the United States, residing at New Orleans, in the parish of Orleans and State of Louisiana, have invented certain new and useful Improvements in Picker Heads; and I do declare the following to be a full, clear, and exact description of the invention, such as will enable others skilled in the art to which it appertains to make and use the same.

My invention relates to improvements in machines for picking cotton and the like, and more particularly to picker heads which are employed at the front ends of picking tubes leading to suitable receivers and adapted to be guided by hand over the cotton or like plants.

The principal object of the invention is to provide an extremely compact picker head embodying both a rotary picker and a prime mover, such as a rotary steam motor or the like, for driving said picker.

Another object is to equip the rotary picker with projectable and retractable fingers and to make novel provision for alternately projecting and retracting said fingers, whereby they are made to pick the cotton from the plants, carry it into a receiving passage in the head and then release the cotton to be acted on by the suction through this passage and the hose or the like with which it is connected.

A still further object is to provide the head with a pair of opposed cheeks at the sides of the receiving passage, to carry the fluid pressure motor or prime mover by one of these cheeks and to equip the other cheek with means for projecting and retracting the picking fingers.

A still further object is to provide a hollow rotary picker and to mount the carrier for the picking fingers in said hollow picker to economize in space.

Yet another object is to so form the rotary picker as to cause the same to coact with one side of the receiving passage in feeding the cotton into such passage.

With the foregoing in view, the invention resides in the novel combination and construction of parts, herein described and claimed and shown in the drawings.

Figures 1 and 2 are respectively a side elevation and top plan view of a picker head constructed in accordance with my invention.

Figures 3 and 4 are views similar to Figures 1 and 2 but looking in the reverse direction.

Figure 5 is a side elevation partly broken away and in section.

Figure 6 is a transverse section through the picker head as indicated by the line 6—6 of Figure 5.

Figure 7 is a side elevation with parts removed, and in section.

Figure 8 is a view similar to Fig. 7 but showing a different position of parts.

Figure 9 is a plan view with parts in section on line 9—9 of Fig. 3.

Figure 10 is a perspective view of the picker head and the tube by means of which it is connected with a suction hose.

Figure 11 is a disassembled perspective view of the picker head.

Figure 12 is a perspective view of the picking fingers and their carrier.

In the drawings H designates the head as a whole, said head having a neck N and being provided with a receiving passage P leading through said neck. The neck and head are longitudinally divided into two sections S an S' having cheeks C and C', respectively, between which a picking rotor R is mounted.

The two sections S and S' of the head H may be detachably secured together in any preferred manner, as by screws 1, and the neck N of said head is further secured together by being snugly received in a coupling 2 split at one end and provided with a screw or the like 3 for contracting said end around the neck. An externally knurled tube 4 is received in the other end of the coupling 2, which end may be contracted around said tube by a screw or other preferred means 5. The suction hose 6 is connected in any preferred manner with the tube 4 and it is intended that the operator shall hold this tube with one hand while holding a handle 4ª in the other hand, said handle rising from the coupling 2 as shown in the elevations and in Fig. 10.

The cheek C is provided with a cylindrical recess 7 which is by preference provided with a removable lining 8. An intake port 9 and an exhaust port 10 lead respectively to and from the recess 7, said exhaust port preferably discharging through the neck N while the port 9 leads from a fluid pressure supply tube 11. I prefer that the tube 11 shall supply steam from any preferred source. The steam operates a rotor 12 which is eccentrically mounted in the recess 7 and the exhaust pressure passes through the passage 10 into the tube 4, and since steam is used, such steam serves to moisten the cotton passing from the picker head, whereby it may be more expeditiously handled than when in the usual extremely dry state.

The rotor 12 could be of any suitable construction, but preferably is provided with a pair of opposed piston blades 13 which are forced into contact with the lining 8 by means of a coil spring or the like 14. Opposite sides of the blades 13 are provided with suitable spring-pressed packings 15 while the opposite sides of the rotor 12 are equipped with semi-circular packings 16. The packing 15—16 at one side of the rotor contacts with a part of the lining 8, while the other packing means similarly contacts with the cover plate 17 which closes the recess 7 and is held in place by screws or the like 18.

The rotor 12 is provided with an axial shaft 19 which spans the space between the two cheeks C and C', said shaft being rotatably mounted in appropriate bearings 20 carried by said cheeks. When the rotor and shaft are removed, the bearing 20 of the cheek C may be removed into the recess 7, but the other bearing 20 is outwardly movable whenever necessary, being held in place in the cheek C', however, by suitable screw caps or the like 21. A screw 22 is shown threaded in the free end of the shaft 32 and contacting with the bearing 20 of the cheek C' to hold said shaft against endwise shifting in one direction, while the hub 12' on the rotor 12, abuts the other bearing 20 and thereby holds the shaft against movement in the opposite direction.

The picking fingers of the picking rotor R are designated by the numerals 23, and these fingers are slidable through guide openings 24 which extend through the peripheral wall 25 of said rotor and through a central circumferential flange 26 with which said wall is provided. The opposite ends of the wall 25 are provided with widened rim portions 25$^a$ which are received in annular channels 25$^b$ formed in the inner sides of the cheeks C and C'. This construction insures against any foreign matter entering the hollow rotor R and thereby interfering with the working parts therein. The peripheral wall 25 of the rotor R is shown carried only by a diametrical bar 27 which in the present showing, is keyed at 28 on the shaft 19, although it could otherwise be secured to said shaft. The bar 27 constitutes a runway for guiding a reciprocatory carrier 30 for the picking fingers 23, said carrier being by preference in the form of an open ring, said ring having notches 31 in one side slidably receiving the bar 27, while the opposite side of said ring is formed with preferably parallel thrust shoulders 32, between which a fixed eccentric 33 on the inner side of the cheek C' operates. It thus follows that as the rotor R is driven by the fluid pressure motor, the carrier 30 is reciprocated along the bar 27 with the result that fingers 23 are alternately projected forwardly from the rotor for picking the cotton and then retracted for discharging said cotton into the passage P after first moving it into said passage.

It is obvious that the carrier 30 might be of other construction than that shown and that although an eccentric such as 33 is preferable, other suitable provision could be made for reciprocating said carrier in the required manner.

The head H, which may also be termed a frame, is provided with an abutment device which is disposed in front of the path of the picker pins 23 and in position to engage a cotton boll while the pins are removing cotton therefrom. In the embodiment illustrated, this abutment device is in the form of a finger or lug F formed as an integral part of the section S' and extending longitudinally beyond the end of the passage P.

In operation, steam is supplied through the tube 11 to the rotary motor, with the result that the rotor 12 of this motor drives the shaft 19 and consequently the picking rotor R carried by said shaft. During rotation of this picking rotor, the eccentric 33 and the carrier 30 serve to alternately project and retract the picking fingers 23, causing them to first remove the cotton from the plants, then carry such cotton into the passage P, and finally release such cotton to permit the suction through the hose 6 and tube 4 to act thereon, carrying it to the picking machine in the usual manner. As steam is used as a motive power, the exhaust of said steam through the passage 10, dampens the cotton and thereby places it in condition to be operated on much more advantageously than when in an extremely dry state. It will be observed that due to the spaced relation of the rotor R with the side of the passage P opposed thereto, the peripheral wall 25 and the flange 26 of said rotor will coact with said side of the passage to compress the cotton as it enters the head, this action in connection with that of the fingers 23, serving to effectively feed the cotton into the passage P.

The invention is comparatively simple and inexpensive, yet is highly efficient and in every way desirable, particular attention being directed to the fact that a common carrying head is provided both for a rotary picker and a prime mover which operates said picker, this construction being greatly advantageous over somewhat similar arrangements in which a flexible or like shaft has been run from the frame of the picking machine to drive a rotary picker at the picker head.

A picker constructed as shown by the present application, has been used with great success, and details set forth are, therefore, by preference followed. Nevertheless, it is to be understood that within the scope of the invention as claimed, the device may be embodied in forms other than that shown.

I claim:

1. A picking device comprising a head having a receiving passage and opposed cheeks at the sides of said passage, one of said cheeks having a circular recess and intake and exhaust ports therefor, a rotary picker mounted between said cheeks, and a fluid driven rotor operatively mounted in said recess and connected to said picker for driving the same.

2. A picking device comprising a head having a receiving passage and opposed cheeks at the sides of said passage, one of said cheeks having a circular recess and intake and exhaust ports therefor, axially aligned bearings carried by said cheeks, a fluid driven rotor mounted operatively in said recess, and having a short shaft spanning the space between the two cheeks and received in said bearings, and a rotary picker mounted on said shaft between said cheeks.

3. A picking device comprising a head having a receiving passage and opposed cheeks at the sides of said passage, a hollow rotor mounted between said cheeks and having a projectable and retractable picking finger, a carrier for said finger within said rotor, said carrier having notches in one side and spaced shoulders on its other side, a bar extending diametrically across said hollow rotor and received in said notches to slidably mount the carrier, an eccentric on one of said cheeks received between said spaced shoulders, and means carried by the other cheek for rotating said rotor.

4. A picking device comprising a head having a receiving passage, a picking rotor carried by said head at one side of said passage and mounted on an axis extending transversely of said passage, and means for rotating said picking rotor in a direction to move its periphery into the end of said passage.

5. A structure as specified in claim 8, said rotor having a continuous peripheral flange and a picking finger extending slidably therethrough, and means for projecting and retracting said finger as said rotor rotates.

6. A picker comprising a head having a receiving passage and opposed cheeks at the sides of said passage, the inner sides of said cheeks being substantially parallel and having opposed circular channels, a rotary picker mounted between said cheeks and having laterally extending rim portions received in said channels, and means for rotating said picker.

7. A picker comprising a head having a rearwardly extending neck, said head and neck being longitudinally divided into two sections, each of which is provided with an upstanding cheek, a rotary picker mounted between said cheeks, and a handle carrying coupling into which the neck of said head extends, said coupling being adapted for operatively connecting said head with a suction tube.

8. In a picker head, the combination with a frame provided with a suction tube connection, of a rotary cylinder mounted in said frame, said cylinder having a peripheral flange, picker pins passing through the wall of the cylinder and through said peripheral flange, and means for causing said picker pins to be projected and withdrawn during the rotation of the cylinder.

9. In a picker head, the combination with a frame provided with a suction tube connection, of a rotary cylinder mounted in said frame, said cylinder having a peripheral flange, a reciprocatory member within said cylinder, and picker pins secured to diametrically opposite parts of said member and projecting therefrom, respectively, in opposite directions, said picker pins passing freely through the wall of the cylinder and said peripheral flange.

10. In a picker head, the combination with a frame provided with a suction tube connection, of a rotary cylinder in said frame, said cylinder having a peripheral flange, means whereby said cylinder may be rotated, a reciprocatory carrier mounted in said cylinder, picker pins secured to said carrier and projecting respectively in opposite directions through the wall of the cylinder and through said peripheral flange, and means for causing said carrier to reciprocate when the cylinder is rotated.

11. In a picker head, the combination with a frame provided with a suction tube connection, of a rotary structure comprising in a single piece, a rotary cylinder having a peripheral flange, a hub and spokes connecting said hub with the wall of the cylinder, a reciprocatory carrier within said cylinder and guided by said spokes, picker pins secured to said carrier and passing freely through the wall of the cylinder and through said peripheral flange, a driving shaft secured to the hub of the cylinder, and means for causing the carrier to reciprocate when the cylinder is rotated.

12. In a picker head, the combination with a frame having a chamber open at both ends, and a suction tube connection communicating with one end of said chamber, of a rotary cylinder mounted in the frame, under said chamber and having a peripheral flange, picker pins passing through the wall of the cylinder and through the peripheral flange thereof, and means for causing said pins to be projected and withdrawn when the cylinder is rotated.

In testimony whereof I have hereunto set my hand.

WILLIAM L. BAKER.